(12) United States Patent
Hasei et al.

(10) Patent No.: US 7,517,125 B2
(45) Date of Patent: Apr. 14, 2009

(54) MANUFACTURING METHOD OF BACKLIGHT UNIT, AND BACKLIGHT UNIT, ELECTRO-OPTIC DEVICE, AND ELECTRONIC APPARATUS

(75) Inventors: Hironori Hasei, Okaya (JP); Akira Inagaki, Suwa (JP); Kazumi Aruga, Fujimi (JP)

(73) Assignee: Seiko Epson Corporation (JP)

( * ) Notice: Subject to any disclaimer, the term of this patent is extended or adjusted under 35 U.S.C. 154(b) by 147 days.

(21) Appl. No.: 11/423,598

(22) Filed: Jun. 12, 2006

(65) Prior Publication Data
US 2006/0290839 A1 Dec. 28, 2006

(30) Foreign Application Priority Data
Jun. 13, 2005 (JP) ............... 2005-171956

(51) Int. Cl.
*F21V 11/00* (2006.01)
(52) U.S. Cl. ............... 362/558; 362/26; 362/27; 362/600; 362/607; 362/620
(58) Field of Classification Search ............... 362/558, 362/26, 27, 600, 603, 606, 607, 618, 619, 362/620, 355; 359/619–623; 349/62–64; 40/564, 565
See application file for complete search history.

(56) References Cited

U.S. PATENT DOCUMENTS

| 7,085,060 | B2 | 8/2006 | Matsushita et al. |
| 7,121,709 | B2 * | 10/2006 | Shinohara et al. ........... 362/606 |
| 2005/0002204 | A1 * | 1/2005 | Lin et al. ................. 362/551 |
| 2005/0007669 | A1 * | 1/2005 | Sakai ..................... 359/619 |

FOREIGN PATENT DOCUMENTS

| JP | 63-068814 | 3/1988 |
| JP | 2004-126016 | 4/2004 |
| JP | 2004-157430 | 6/2004 |
| JP | 2004-191611 | 7/2004 |
| JP | 2004-240294 | 8/2004 |
| JP | 2004-309801 | 11/2004 |
| JP | 2004-319171 | 11/2004 |
| JP | 2005-508565 | 3/2005 |
| WO | WO 03/008860 | 1/2003 |

* cited by examiner

*Primary Examiner*—Sandra O'Shea
*Assistant Examiner*—Mark Tsidulko
(74) *Attorney, Agent, or Firm*—Harness, Dickey & Pierce, P.L.C.

(57) ABSTRACT

A backlight unit including: a light source that irradiates light; and a diffusing plate that diffuses the light irradiated from the light source, wherein the diffusing plate is provided with a first microlens of ellipsoid form, and a second microlens of ellipsoid form disposed in such a manner that long axes of the first microlens and the second microlens are approximately perpendicular to each other, and a long axis direction of the first microlens and a long axis direction of the light source are arranged approximately parallel to each other, and a long axis direction of the second microlens and the long axis direction of the light source are arranged approximately perpendicular to each other.

8 Claims, 8 Drawing Sheets

MANUFACTURING METHOD OF BACKLIGHT UNIT, AND BACKLIGHT UNIT, ELECTRO-OPTIC DEVICE, AND ELECTRONIC APPARATUS

BACKGROUND

1. Technical Field

The present invention relates to a manufacturing method of a backlight unit, and to a backlight unit, an electro-optic device, and an electronic apparatus.

2. Related Art

Conventionally, in a liquid crystal display device as an electro-optic device, there has been a light collecting method in which an optical sheet having a plurality of elliptical shaped microlenses is arranged in a backlight unit for liquid crystal display built in the liquid crystal display device so that light from a light source for illumination of the backlight unit is collected effectively to a liquid crystal element (pixel). Moreover, there has been reported many methods of forming a microlens by use of a droplet discharging method (for example, a first example of related art).

As disclosed in a second example of related art, for example, there has been a backlight unit of an edge-lighting type (side-lighting type) which is constructed such that a liner-shaped lamp as a light source is arranged along the side face of a light-guiding plate. Moreover, bas been proposed a method in which a plurality of elliptical shaped microlenses having a long axis and a short axis are formed on a sheet of a synthetic resin and the like by use of molds etc.

JP-A-2004-157430 is a first example of related art.
JP-A-2004-309801 is a second example of related art.

In these methods, however, the number of the liner-shaped lamps capable of being mounted is limited. Therefore, the brightness of a display screen cannot be secured in a case of a large display screen. Moreover, it is difficult to manufacture a large-sized display screen due to a problem of mass of the light-guiding plate. On the other hand, in a direct-lighting type backlight unit where the liner-shaped lamp is arranged directly under the display screen, the number of the liner-shaped lamps is increased depending on the display size. Therefore, there has been no problem in the brightness but may have been problem in a brightness ununiformity due to a brightness difference of the liner-shaped lamp itself and a brightness ununiformity between a portion directly under which the liner-shaped lamp exits and a portion directly under which no liner-shaped lamp exits. In addition, if the liner-shaped lamp is spaced away from the face of the display screen surface, the brightness ununiformity is improved, but the brightness of the display screen is deteriorated, and thereby the thickness of the backlight unit is difficult to be reduced. The number of the liner-shaped lamps can be increased depending on the display size in order to make the display brighter. However, the increase in the number of the lamps may cause the problems such as the heat generation, cost, and others.

SUMMARY

An advantage of the invention is to provide a manufacturing method of a backlight unit in which the brightness uneveness can be lowered and the lightness is high, and to provide a backlight unit, electro-optic device, and electronic apparatus with good optical characteristics.

A backlight unit according to a first aspect of the invention includes a light source that irradiates light, and a diffusing plate that diffuses the light irradiated from the light source. The diffusing plate is provided with a first microlens of ellipsoid form, and a second microlens of ellipsoid form disposed in such a manner that long axes of the first microlens and the second microlens are approximately perpendicular to each other. A long axis direction of the first microlens and a long axis direction of the light source are arranged approximately parallel to each other. A long axis direction of the second microlens and the long axis direction of the light source are arranged approximately perpendicular to each other.

According to the first aspect of the invention, in a direct-lighting type backlight unit, in a case the long axis of the first microlens is arranged approximately parallel to a longitudinal direction of the light source, since the long axis of the microlens has smaller curvature than a short axis thereof, light is likely to diffuse and the brightness ununiformity can be lowered. In a case a short axis of the second microlens is arranged approximately parallel to the longitudinal direction of the light source, since the short axis of the microlens has larger curvature than the long axis thereof, light is likely not to diffuse and the lightness is heightened. Therefore, there can be provided the backlight unit in which the brightness ununiformity can be lowered and the lightness is high, by disposing the first microlens and the second microlens in such a direction that they are perpendicular to each other.

It is preferable that the backlight unit is a direct-lighting type.

In this case, the backlight unit is the direct-lighting type. Therefore, since a liner-shaped lamp is arranged between the reflecting plate and the diffusing plate, leakage of light can be reduced and there can be provided the backlight unit in which the brightness ununiformity can be more lowered and the lightness is high.

It is preferable that, in the backlight unit, the microlens is disposed in a zigzag fashion.

In this case, the microlens is disposed in a zigzag fashion. Therefore, since the microlens is disposed on a substrate with a high density, the light-diffusing property and light-collecting property tend to be more enhanced and there can be provided the backlight unit having less brightness ununiformity and higher lightness.

It is preferable that, in the backlight unit, the microlens is formed by a liquid droplet discharging method.

In this case, the microlens is formed by a liquid droplet discharging method. Therefore, since it is not necessary to prepare molds etc., a cost of making molds dose not occur, and it is economical. In addition, if the shape of the microlens or the disposing position is changed, it is easily done by only varying the condition of the liquid droplet discharging.

A method of manufacturing a backlight unit according to a second aspect of the invention, the backlight unit being provided with a light source that irradiates light, and a diffusing plate that diffuses the light irradiated from the light source, the method includes: forming the diffusing plate having a plurality of first microlenses of ellipsoid form, and a plurality of second microlenses of ellipsoid form disposed in such a manner that long axes of the first microlens and the second microlens are approximately perpendicular to each other; and assembling the backlight unit in such a manner that a long axis direction of the first microlens and a long axis direction of the light source are arranged approximately parallel to each other, and a long axis direction of the second microlens and the long axis direction of the light source are arranged approximately perpendicular to each other.

According to the second aspect of the invention, in a direct-lighting type backlight unit, in a case that the long axis of the first microlens is arranged approximately parallel to the longitudinal direction of the light source, since the long axis of the microlens has smaller curvature than a short axis thereof, light is likely to diffuse and the brightness ununiformity can be lowered. In a case that a short axis of the second microlens is arranged approximately parallel to the longitudinal direction of the light source, since the short axis of the microlens has larger curvature than the long axis thereof, light is likely not to diffuse and the lightness is heightened. Therefore, there can be provided the backlight unit in which the brightness ununiformity can be lowered and the lightness is high, by disposing the first microlens and the second microlens in such a direction that they are perpendicular to each other.

It is preferable that, in the method of manufacturing a backlight unit, in assembling the backlight unit, the backlight unit is assembled into a direct-lighting type.

In this case, the backlight unit is assembled into the direct-lighting type. Therefore, since the liner-shaped lamp is arranged between the reflecting plate and the diffusing plate, leakage of light can be reduced and there can be provided the backlight unit in which the brightness ununiformity can be more lowered and the lightness is high.

It is preferable that, in the method of manufacturing a backlight unit, in forming the diffusing plate, the microlens is formed in a manner of being disposed in a zigzag fashion.

In this case, the microlens is disposed in a zigzag fashion. Therefore, since the microlens is disposed on a substrate with a high density, the light-diffusing property and light-collecting property tend to be more enhanced and there can be formed the backlight unit having less brightness ununiformity and higher lightness.

It is preferable that, in the method of manufacturing a backlight unit, in forming the diffusing plate, the microlens is formed by a liquid droplet discharging method. A method of forming the microlens by the liquid droplet discharging method is described in the followings. 1. The forming method includes a step of disposing a droplet composed of the lens material on a substrate; a step of forming a droplet of elliptical shape, in which before the disposed droplet is hardened, a droplet is disposed at a displaced position from the disposed droplet so as to overlap a part of the disposed droplet; and a step of hardening the elliptical shaped droplet. 2. The forming method includes a step of disposing a first droplet composed of the lens material on the substrate, a step of hardening the first droplet to form a lens, a step of disposing a second droplet less in an amount than the first droplet so as to overlap a part of the lens, a step of hardening the second droplet to form an elliptical shaped lens, a step of disposing a third droplet further at a disposing position opposed to the second droplet so as to overlap a part of the elliptical shaped lens, and a step of hardening the third droplet. 3. The forming method includes a step of disposing a first droplet composed of the bank material on the substrate, step of forming a base of elliptical shape by hardening the first droplet disposed on the substrate, a step of disposing a second droplet composed of the lens material on the elliptical shaped base, and a step of hardening the second droplet. 4. The forming method includes a step of disposing a plurality of droplets composed of the lens material on the substrate such that the droplets is spaced from one another, a step of hardening the plurality of droplets to form a plurality of lenses, a step of further disposing droplets between the plurality of lenses formed, and a step of hardening the droplets.

In this case, the microlens is formed by a liquid droplet discharging method. Therefore, since it is not necessary to prepare molds etc., a cost of making molds dose not occur, and it is economical. In addition, if the shape or disposing position of the microlens is changed, it is easily done by only varying the condition of the liquid droplet discharging. Since the microlens is easy to form, the productivity of the microlens can be improved.

A diffusing plate according to a third aspect of the invention, which diffuses light, includes a rectangular substrate, a first microlens of ellipsoid form having a long axis approximately parallel to an edge of the rectangular substrate, and a second microlens of ellipsoid form having a long axis approximately perpendicular to the edge of the rectangular substrate.

According to the third aspect of the invention, there exist the microlenses in such a manner that the long axis directions of the light source and the microlens are arranged in mixed states where those are approximately parallel and where those are approximately perpendicular to each other. Therefore, there can be provided the diffusing plate in which the brightness ununiformity can be lowered and the lightness is high.

It is preferable that, in the diffusing plate, the first microlens and the second microlens are disposed in different directions from each other.

In this case, since the first microlens and the second microlens are disposed in different directions from each other, light is likely to be diffused and there can be provided the diffusing plate in which the brightness ununiformity can be lowered and the lightness is high.

An electro-optic device according to a fourth aspect of the invention, includes a liquid crystal panel, and a backlight unit. As the backlight unit, the backlight unit described above is provided to the electro-optic device.

According to the fourth aspect of the invention, the electro-optic device is provided with the backlight unit in which the brightness ununiformity can be lowered and the lightness is high. Therefore, there can be provided the electro-optic device in which the brightness ununiformity can be lowered and the lightness is high. In addition, since the diffusing plate provided with the elliptical shaped microlens is formed easily by the liquid droplet discharging method, the productivity of the backlight unit and the electro-optic device can be improved.

An electronic apparatus according to a fifth aspect of the invention, includes the electro-optic device described above.

According to the fifth aspect of the invention, the electronic apparatus is provided with electro-optic device in which the brightness ununiformity can be lowered and the lightness is high. Therefore, there can be provided the electronic apparatus of which display performance can be improved. Moreover, since the electro-optic device is easy to form, the productivity of the electronic apparatus can be improved.

BREIF DESCRIPTION OF THE DRAWINGS

The invention will be described with reference to the accompanying drawings, wherein like numbers reference like elements.

DESCRIPTION OF EXEMPLARY EMBODIMENS

Embodiment

In an embodiment of the invention, an explanation will be given of a backlight unit having a diffusing plate provided with elliptical shaped microlenses formed on a substrate by a liquid droplet discharging method. The diffusing plate is provided with a first microlens of elliptical shape having a long axis, and a second microlens in a direction perpendicular to the first microlens. A long axis direction of the first microlens and a long axis direction of a liner-shaped lamp are arranged approximately parallel to each other. A long axis direction of the second microlens and the long axis direction of the liner-shaped lamp are arranged approximately perpendicular to each other.

Figure 1:
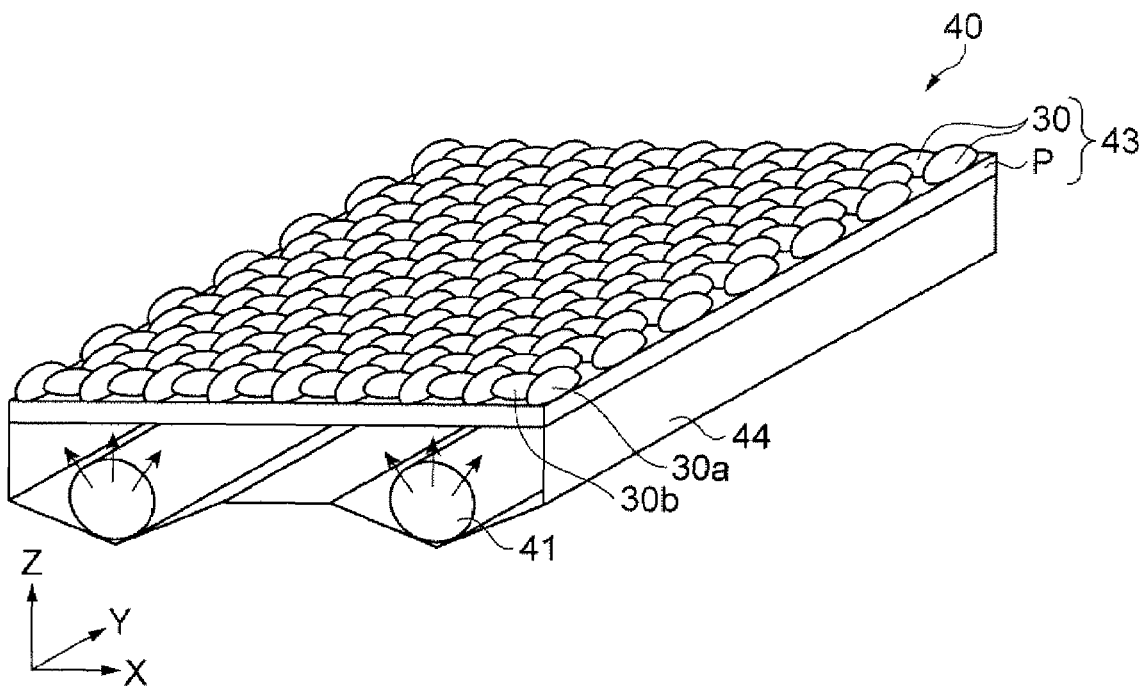
FIG. 1 is a schematic perspective view showing an example of a backlight unit according to an embodiment of the invention.

FIG. 1 is a schematic perspective view showing an example of a backlight unit 40 of the embodiment. With reference to FIG. 1, the backlight unit 40 of the embodiment of the invention is explained.

As shown in FIG. 1, the backlight unit 40 is a direct-lighting type. The backlight unit 40 is constructed with a liner-shaped lamp 41 as a light source, a diffusing plate 43 for diffusing light irradiated from the liner-shaped lamp 41, and a reflecting plate 44 for reflecting light. The diffusing plate 43 is formed in such a manner that a plurality of elliptical shaped microlenses 30 on a substrate P. There are the plural liner-shaped lamps 41 (two, in the embodiment). The liner-shaped lamp 41 arranged between the reflecting plate 44 and the diffusing plate 43, and light emitted from the liner-shaped lamp 41 is irradiated to the back side of the substrate P.

The construction of the backlight unit 40 is as described above. A manner of irradiating light of the backlight unit 40 is explained.

When the liner-shaped lamp 41 is lit, the liner-shaped lamp 41 emits light, and the light is incident on the back face side of the substrate P. A part of the emitted light which the liner-shaped lamp 41 emits is reflected by the reflecting plate 44, and the reflected light is incident on the substrate P. The incident light and the reflected light which are incident on the substrate P are diffused by the elliptical shaped microlenses 30 and emitted. The light incident on the substrate P is reflected by a pattern (illustrating is omitted) formed on the back face side of the substrate P. The pattern is arranged such that a light amount passed through the substrate P is uniform in the face of the substrate (illustrating is omitted).

Figure 2:
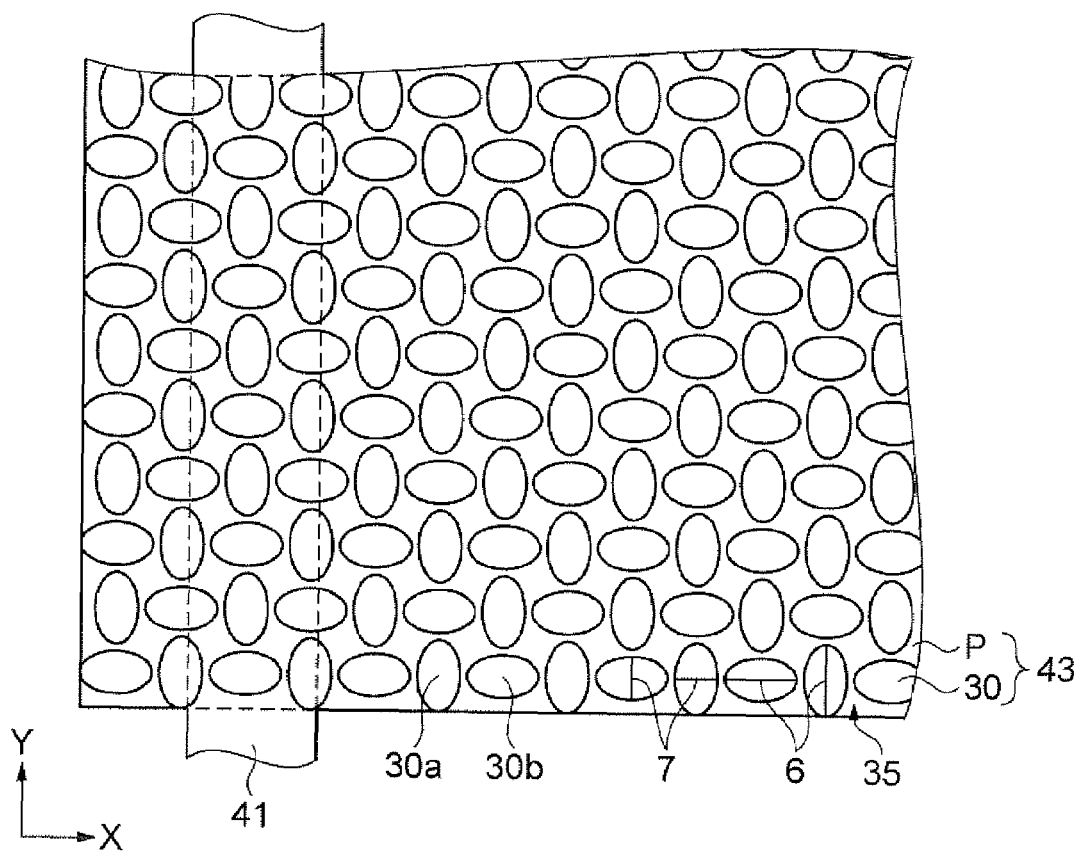
FIG. 2 is a view showing an example of a diffusing plate.

FIG. 2 is a view showing an example of the diffusing plate 43 of the embodiment. With reference to FIG. 2, the diffusing plate 43 of the embodiment of the invention is explained.

As shown in FIG. 2, the diffusing plate 43 is provided with the substrate P, and the plurality of elliptical shaped microlenses 30 (microlens array 35) arranged on the surface of the substrate P.

The substrate P has to transmit light beam, and therefore is made of a transparent, particularly transparent and colorless synthetic resin. Examples of the resin used for the substrate P include, not particularly limited, polyethylene terephthalate, polyethylene naphthalate, acrylate resin, polycarbonate, polystyrene, polyolefin, cellulose acetate, weather proof vinyl chloride, and radiation curing resin.

The thickness (average thickness) of the substrate P is not particularly limited but, for example, 10 μm or more and 500 μm or less, preferably 35 μm or more and 250 μm or less, and particularly preferably 50 μm or more and 188 μm or less. When the thickness of the substrate P is less than the above ranges, such disadvantages occur that a curl tends to be generated by exposing the substrate to heat in the backlight unit or the like, and handling the substrate is difficult. In contrast, when the thickness of the substrate P exceeds the above ranges, brightness of the liquid crystal display device may be lowered, and the thickness of the backlight unit may become larger against requiring a thinned liquid crystal display device.

The microlens array 35 is constituted by the plurality of elliptical shaped microlenses 30 arranged on the surface of the substrate P in a protruding manner. The elliptical shaped microlens 30 is a convex shape.

The elliptical shaped microlenses 30 include the first microlens 30a and the second microlens 30b formed in a direction perpendicular to the first microlens 30a. The long axis direction of the first microlens 30a is arranged approximately parallel to the long axis direction of the liner-shaped lamp 41. The long axis direction of the second microlens 30b is arranged approximately perpendicular to the long axis direction of the liner-shaped lamp 41.

Since the long axis directions of the first microlens 30a and the liner-shaped lamp 41 are arranged approximately parallel to each other, light is likely to diffuse with resulting lowering the brightness ununiformity at a long axis 6 having smaller curvature than a short axis 7. On the other hand, since a short axis direction of the second microlens 30b and the long axis direction of the liner-shaped lamp 41 are arranged approximately perpendicular to each other, light is likely not to diffuse with resulting heightening the higher lightness at the short axis 7 having larger curvature than the long axis 6. That is, by disposing the elliptical shaped microlenses 30 as described above, such a diffusing plate 43 can be formed that has the low brightness ununiformity and the high lightness. The elliptical shaped microlens 30 has a convex shape and an elliptical shape.

The elliptical shaped microlenses 30 are disposed on the surface of the substrate P relatively densely and geometrically. Specifically, the elliptical shaped microlenses 30 are disposed in a zigzag arrangement pattern on the surface of the substrate P. Furthermore, a pitch of arrangement and a distance between the lenses is constant. By the zigzag arrangement pattern, the microlenses 30 the shape of which in plan view is an elliptical shape can be disposed most densely. Therefore, optical functions of the diffusing plate 43 such as a light-collecting function and a diffusing function can be enhanced.

Since, the elliptical shaped microlenses 30 are disposed on the substrate P with a high density in a zigzag fashion, there exists less space on the substrate 30 not disposed with the elliptical shaped microlenses 30, more light is passed through the microlens 30, and the light-diffusing property and the light-collecting property tend to be more enhanced. Therefore, the backlight unit 40 having the more lowered brightness ununiformity and the more heightened lightness can be fomed (see, FIG. 1).

Moreover, there exist the first microlenses 30a such that the long axis directions of the liner-shaped lamp 41 and the microlens 30a are arranged in mixed states where those are approximately parallel and where those are approximately perpendicular to each other (see, FIG. 2). Similarly, there exist the second microlenses 30b such that the long axis directions of the liner-shaped lamp 41 and the microlens 30b are arranged in mixed states where those are approximately perpendicular and where those are approximately parallel to each other (see, FIG. 2). By this arrangement, there can be provided the diffusing plate in which the brightness ununiformity can be lowered and the lightness is high. Moreover, even if the first microlens 30a and the second microlens 30b are disposed in a different direction, the light passed through the first microlens 30a and the second microlens 30b is made to be a light easy to diffuse and a light not easy to diffuse. Therefore, the diffusing plate in which the brightness ununiformity is likely to be lowered and the lightness is likely to be heightened can be provided.

Figure 3:
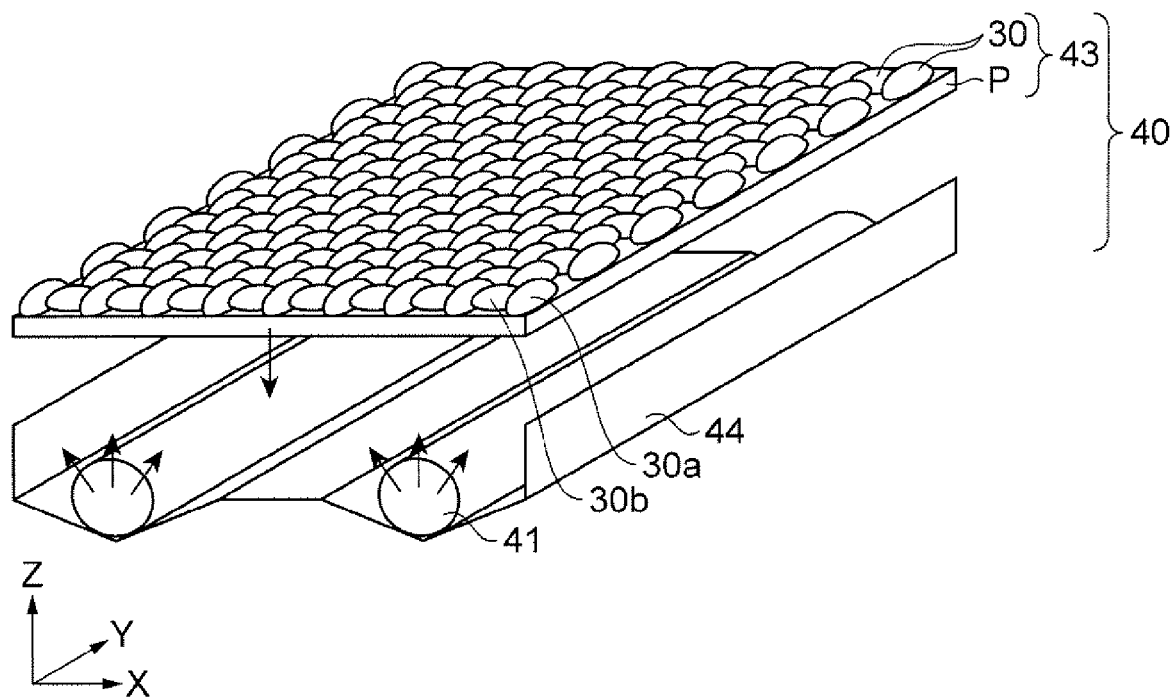
FIG. 3 is a view showing an example of a method of assembling the backlight unit.

FIG. 3 is a view showing an example of a method of assembling the backlight unit 40 of the embodiment. With reference to FIG. 3, the method of assembling the backlight unit 40 of the embodiment of the invention is explained.

As shown in FIG. 3, the backlight unit 40 is assembled in such manner that the diffusing plate 43 is engaged with the reflecting plate 44 provided with the liner-shaped lamp 41. The backlight unit 40 can be assembled by, for example, arranging the diffusing plate 43 on the reflecting plate 44. Therefore, the backlight unit 40 is formed as shown in FIG. 1. The backlight unit 40 is low in the brightness ununiformity and high in the lightness, because it has the diffusing plate 43 provided with the lowered brightness ununiformity and the higher lightness. Therefore, the number of the liner-shaped lamps 41 as a light source need not be increased, and thereby the problems such as the heat generation, cost, and weight of the liner-shaped lamp 41 can be suppressed. Moreover, the backlight unit 40 more reduced in weight can be formed. In addition, since a distance between the liner-shaped lamp 41 and a display screen surface can be decreased, the thickness of the backlight unit 40 can be reduced.

Next, the explanation will be given of a liquid droplet discharging method, a surface treatment method, bank material, microlens material, and a hardening process method of bank material and microlens material which are used in a method of liquid droplet discharging for making the elliptical shaped microlens 30, in this order.

Liquid Droplet Discharging Method

Examples of a discharge technique of the liquid droplet discharging method include an electrification controlling method, a pressure vibration method, an electromechanical conversion method, an electro-thermal conversion method, and an electrostatic absorption method. Here, the electrification control method is one in which an electric charge is imported to the material by a charging electrode, and the material is discharged from a discharge nozzle while its direction of emission is controlled by a deflection electrode. The pressure vibration method is one in which a very high pressure of about 30 kg/cm² is applied to the material so that it is discharged from the tip of the nozzle, so that, if no control voltage is applied, the material is discharged from the nozzle in a straight line, while if a control voltage is applied, electrostatic repulsion is engendered between the various portions of the material, so that the material is scattered and is not discharged in a straight line from the nozzle. The electromechanical conversion method is one which takes advantage of the characteristic that a piezo element (a piezo-electric element) deforms when it is subjected to a pulse type electrical signal, by applying a pressure by such a deformation of a piezo element, via a flexible member, to a space in which the material is stored, so that material is pushed out from this space to be discharged from the discharge nozzle.

The electro-thermal conversion method is one in which the material is abruptly vaporized by a heater provided within a space in which the material is stored so that bubbles are generated therein, and then the material within this space is discharged therefrom due to the pressure of the bubbles. The electrostatic absorption method is one in which a very small pressure is applied to the space in which the material is stored, so that a meniscus is created upon the material at a discharge nozzle, and then, in this state, the material is discharged by subjecting it to static electrical attraction. Furthermore, in addition to these, it is also possible to apply techniques such as a method which takes advantage of the change of viscosity of a liquid due to an electric field, or a method in which the liquid is caused to be discharged by an electric spark discharge, or the like. These liquid droplet discharging methods do not waste any material, rather, they have the advantageous feature that they can dispose an appropriate and desired amount of liquid material in the desired position. It should be understood that the amount of the liquid material in a single drop which is discharged by any one of these liquid droplet discharging methods is, for example, from 1 to 300 nanograms.

Figure 4:
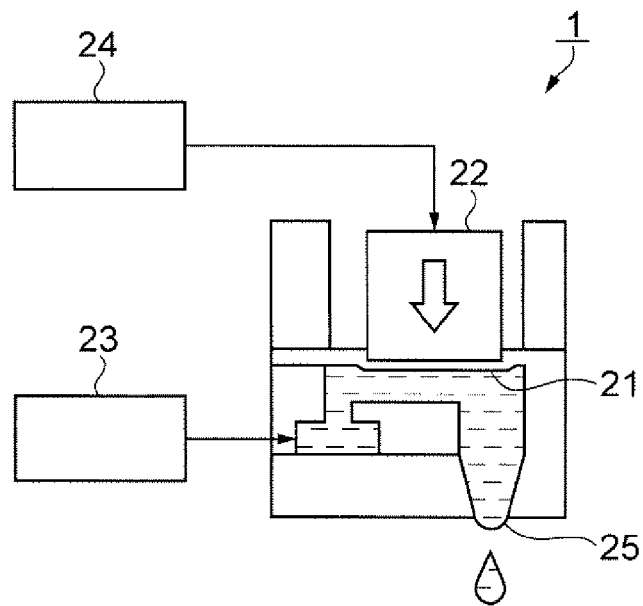
FIG. 4 is a view for explaining a principle of discharging liquid material by a piezo method.

FIG. 4 is a view for explaining a principle of discharging liquid material by a piezo method.

In FIG. 4, a piezo element 22 is disposed in the vicinity of and in contact with a liquid chamber 21 in which the liquid material is stored. The liquid material is supplied to the liquid chamber 21 via a liquid material supply system 23 which includes a liquid material tank in which the liquid material is stored. The piezo element 22 is connected to a drive circuit 24, and by voltage being applied to the piezo element 22 via this drive circuit 24 so that this piezo element 22 is deformed, the liquid chamber 21 is likewise deformed, and the liquid material therein is discharged from the nozzle 25. At this time, the amount of deformation of the piezo element 22 is controlled by varying the value of the voltage which is applied. Moreover, the speed of deformation of the piezo element 22 can be controlled by varying the frequency of the applied voltage. Since, with this piezo method of liquid droplet discharge, no heat is applied to the material, there is the beneficial aspect that it is unlikely that any negative influence will be exerted upon the composition of the material.

Surface Treatment Process

Examples of the surface treatment process include a method of forming an organic thin film on a surface of a substrate as a liquid repellent process for controlling a contact angle of a droplet, or the plasma processing method. In order to perform the liquid repellent process well, it is preferable to perform washing as a pretreatment. For example, ultraviolet washing, ultraviolet/ozone washing, plasma cleaning, acid/alkali washing and the like can be employed.

In the method of forming an organic thin film as a liquid repellent process, an organic thin film is formed, which is made from an organic molecule such as silane compound and a surfactant, on the surface of the substrate upon which a wiring pattern is to be created.

Organic molecules for processing the surface of the substrate have a functional group which can be physically or chemically combined with the substrate, and a functional group which modifies the quality of (i.e., controls the surface energy of) the surface of the substrate, i.e., a group having an affinity with liquid or a liquid repelling group positioned at the opposite side of the substrate-combinable functional group. The organic molecules are combined with the substrate to form an organic thin film, and ideally constitute a mono molecular film. Among these, there is the organic molecule of which an organic constitution connecting the substrate-combinable functional group and the functional group modifying the quality of the surface of the substrate at the opposite side thereof is a carbon straight chain or a carbon chain which branches off from one portion thereof. The organic molecule is combined with the substrate and self-assembled to form a dense self-assembled film.

Here, the term "self assembled film" means a film which consists of connecting functional groups which can react with the constituent atoms of the under-layer of the substrate or the like, and a straight-chain and aromatic ring structure of other than the connecting functional groups, and which is made by orienting a compound which has extremely high orientability due to Van-der-Waals interaction between portions of the straight-chains and II-II stacking between the aromatic rings. Since such a self assembled film is made by orienting monomolecules, it can be made extremely thin, and moreover it is a very uniform film upon at a molecular level. That is, the same molecules are positioned on the surface of the film, and thereby uniform and excellent liquid repellency and affinity with liquid are imparted to the surface of the film.

As the compound having extremely high orientability, a silane compound shown by a general formula $R^1SiX^1_aX^2_{(3-a)}$ can be used, for example. In the formula, $R^1$ represents an organic group, $X^1$ and $X^2$ represent —$OR^2$—, —$R^2$, and —Cl, R2 contained in $X^1$ and $X^2$ represents an alkyl group having 1 to 4 carbon atoms, and a is an integer from 1 to 3.

The silane compound represented by the general formula $R^1SiX^1_aX^2_{(3-a)}$ is one in which silane atom is substituted for an organic group, and residual connecting groups are substituted for an alkoxy group or an alkyl group. Examples of the organic group $R^1$ include a phenyl group, a benzyl group, a phenethyl group, a hydroxyphenyl group, a chlorophenyl group, an aminophenyl group, a naphthyl group, an ansurenyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, an n-propyl group, an isopropyl group, a u-butyl group, an isobutyl group, a sec-butyl group, a tert-butyl group, an octadecyl group, an n-octyl group, a chloromethyl group, a methoxyethyl group, a hydroxyethyl group, an aminoethyl group, a cyano group, a mercaptopropyl group, a vinyl group, an allyl group, an acryloxyethyl group, a metacryloxyethyl group, a glycidoxypropyl group, and an acetoxy group.

The organic group $R^1$ is a functional group for constituting an alkoxy group, a chlorine group, Si—O—Si bond and the like for $X^1$, and hydrolyzed with water and withdraws as alcohol or acid. Examples of the alkoxy group include a methoxy group, an ethoxy group, an n-propoxy group, an isopropoxy group, an n-butoxy group, an isobutoxy group, a sec-butoxy group, a tert-butoxy group.

The number of carbon atoms is preferably in a range from 1 to 4, from the view point that the alcohol withdrawn is relatively low in a molecular amount to be removed easily, and deterioration of the density of a film to be formed can be suppressed.

Typical examples of the liquid repellent silane compound represented by the general formula $R^1SiX^1_aX^2_{(3-a)}$ include a fluorine containing alkylsilane compound. In particular, it is the compound in which $R^1$ has a structure expressed by perfluoroalkyl structure $C_nF_{2n+1}$, and n represents an integer from 1 to 18. By use of the fluorine containing alkylsilane compound, the self-assembled film is formed such that each compound is oriented so that a fluoroalkyl group is positioned on the surface of the film. Therefore, uniform liquid repellency can be imparted to the surface of the film.

The silane compounds having a fluoroalkyl group or a perfluoroalkylether structure are generally called as "FAS". These compounds may be used singly or in a combination of two or more of them. By using the FAS, it is possible to obtain good adhesion to the substrate and also good liquid repellency.

In addition to the silane compound, as a compound having high orientability, a surfactant represented by a general formula $R^1Y^1$ can be used. In the formula $R^1Y^1$, $R^1$ represents a hydrophobic organic group, $Y^1$ represents a hydrophilic polar group such as —OH, —(CH2CH2O)nH, —COOH, —COOA, —CONH2, —SO3H, —SO3A, —OSO3H, —OSO3A, —PO3H2, —PO3A, —NO2, —NH2, —NH3B (ammonium salt), =NHB (pyridinium salt), and —$NX^1_3B$ (alkylammonium salt). Note that A represents one or more cations, and B represents one or more anions. Further, $X^1$ represents the same meaning as an alkyl group having 1 to 4 carbon atoms as above description.

A surfactant represented by the general formula $R^1Y^1$ is amphipathic compound, and a compound in which a hydrophilic functional group is bonded to a lipophilic organic group $R^1$. $Y^1$ represents a hydrophilic polar group and is a functional group for connection or attachment to the substrate. $R^1$ has lipophilicity, and is aligned on the opposite side to a hydrophilic face to form a lipophilic face on the hydrophilic face.

Typical examples of the liquid repellent silane compound represented by the general formula $R^1Y^1$ include a fluorine containing alkyl surfactant. In particular, it is the compound in which $R^1$ has a structure expressed by the perfluoroalkyl structure $C_nF_{2n+1}$ or the perfluoroalkylether structure, and n represents an integer from 1 to 18.

These surfactants having the perfluoroalkyl structure or perfluoroalkylether structure may be used singly or in a combination of two or more of them. By using the surfactant having the perfluoroalkyl structure, it is possible to obtain good adhesion to the substrate and also good liquid repellency.

Furthermore, the surfactants may have the alkyl structure not containing a fluorine. In this case also, it is possible to obtain good liquid repellency by forming the dense film by use of a general surfactant.

By disposing the above-described material compounds and the substrate P within the same closed vessel and leaving them in a room temperature environment for about 2 to 3 days, an organic thin film made from the organic molecules such as the silane compound or the surfactant is formed on the substrate P. Further, by maintaining the entire closed vessel at a temperature from 80 to 140 degrees C., the film is formed on the substrate in about from 30 to 60 minutes. This is a forming method in gas phase, but a self-assembled film can be formed in liquid phase. For example, by immersing the substrate in a solution containing the material compound for from 30 minutes to 6 hours, cleaning and drying it, a self-assembled film is formed on the substrate. Moreover, by heating up a solution containing the material compound from 40 to 80 degrees C., a self-assembled film can be formed by immersion for from 5 minutes to 2 hours.

On the other hand, with a plasma processing method, plasma irradiation is performed upon the substrate P at normal pressure or in a vacuum. The type of gas which is utilized for such plasma processing may be selected in consideration of the surface material of the substrate P upon which the wiring pattern is created, and the like. As such a process gas, for example, it is possible to preferably utilize a fluoro carbon compound. For example, tetrafluoro-methane, perfluorohexane, perfluorodecane, or the like can be cited. As one example of processing conditions of the plasma processing ($CF_4$ plasma processing method) using tetrafluoro-methane as a process gas, the plasma power may be 50 to 1000 W, the flow rate of the carbon tetrafluoride gas may be 50 to 100 mL/min, the relative shifting speed of the substrate with respect to the plasma discharge electrode may be 0.5 to 1020 mm/sec, and the temperature of the substrate may be 70 to 90 degrees C.

Bank Matrial

Bank material is not particularly limited so long as it is in liquid form dischargeable on forming a bank and thereafter can be solidified. Examples of such material include various resins and particles such as a resin which is used such that a solution of the resin in solvent is applied and then the solvent is removed, a thermoplastic resin, a thermoset resin, a light hardening resin, a resin solution, a particle dispersion liquid.

As the bank material is generally used organic material such as polyimide, acrylate resin, novolac series resin. In addition, there can be employed an oligomer, a polymer and the like of polyvinyl alcohol, unsaturated polyester, methyl methacryl resin, polyethylene, diallyl phthalate, ethylene propylene diene monomer, epoxy resin, phenol resin, polyurethane, melamine resin, polycarbonate, polyvinyl chloride, polyamide, styrene-butadiene rubber, chloroprene rubber, polypropylene, polybutylene, polystyrene, polyvinyl acetate, polyester, polybutadiene, polybenzimidazole, poly acrylonitrile, epichlorohydrin, polysulfide, and polyisoprene.

Since the bank material must not be dissolved into and reacted to a resin or a solution to which it is brought into contacted, it is preferable a thermoset resin which is hardened by light or heat after being discharged.

Such a light hardening resin is made by hardening a resin composition which has: usually at least one or more functional group; and at least monomers and oligomers, and a light polymerization initiator. The monomers and oligomers are subjected to ionic polymerization or radical polymerization by ion or radical generated by irradiating light to a light polymerization initiator, and increased in molecular weight, and a cross-linked structures of the monomers and oligomers are formed, according to requirement. Here, the functional group is an atomic group or a bonding pattern, which causes reaction, such as a vinyl group, a carboxyl group, an amino group, a hydroxyl group, and an epoxy group.

Moreover, a themoset resin is made by hardening a resin composition which has: usually at least one or more functional group; and at least monomers and oligomers, and a thermal polymerization initiator. The monomers and oligomers are subjected to ionic polymerization or radical polymerization by ion or radical generated by applying heat to a thermal polymerization initiator, and increased in molecular weight, and a cross-linked structures of the monomers and oligomers are formed, according to requirement. Here, the functional group is an atomic group or a bonding pattern, which causes reaction, such as a vinyl group, a carboxyl group, an amino group, a hydroxyl group, and an epoxy group.

A resin solution such as varnish can be employed as a bank in such a manner that a polymer such as polyamide which has excellent heat resistance is dissolved in advance, and precipitated by drying, without hardening by light or heat.

Further, a particle dispersion liquid can be employed from the view point that heat resistance and excellent light transmissivity can be obtained. Examples of the particles include the particles of silica, alumina, titania, calcium carbonate, aluminum hydroxide, acrylate resin, organic silicon resin, polystyrene, urea resin, and formaldehyde condensate. One of these is used, or plural types of these are mixed and used. When the particles are employed, they can be used as a bank in such a manner that they are dried and accumulated to be agglomerated. Moreover, a surface treatment for applying photosensitivity or thermosensitivity may be conducted in order to improve adhesion between the particles and between the substrate and the particles.

A droplet of the bank material may be added with a surface tension adjusting agent of fluorine series, silicon series, non-ion series and others in minute amounts in such a range that the intended function is not lost, according to requirement. These surface tension adjusting agents can control wettability of an object to be applied, improve levelring of an applied film, and help suppressing generation of bumps, irregularity, and the like.

A density of the droplet of the bank material adjusted as described above is preferably from 1 to 50 mPa.s. When the solution is applied by use of a liquid droplet discharging apparatus, in a case that the density is less than 1 mPa·s, the periphery of the nozzle is likely to be contaminated by the droplet flowing out, and in a case that the density is more than 50 mPa·s, a clogging of the nozzle hole more frequently occurs and the droplet is difficult to smoothly discharge. More preferably, it is from 5 to 20 mPa.s.

Furthermore, a surface tension of the droplet of the bank material adjusted as described above is preferably from 1 to 50 mPa.s. The surface tension in this case is desirably in a range from 0.02 to 0.07 N/m. When the solution is applied by use of a liquid droplet discharging apparatus, in a case that the surface tension is less than 0.02 N/m, the wettability of the droplet with respect to the nozzle surface is increased and a curved flight is likely to occur, and in a case that the surface tension exceeds 0.07 N/m, since a meniscus shape is not stable at the tip of the nozzle, the amount and timing of discharge are difficult to control.

Microlens Material

Material to constitute the elliptical shaped microlens 30 is not particularly limited so long as it is in liquid form dischargeable on forming a microlens, thereafter can be hardened, and is a material which can have a function as a miclorens after hardened and has light transmissivity. Examples of the resin include various resins such as a resin which is used such that a solution of the resin having light transmissivity in solvent is applied and then the solvent is removed, a thermoplastic resin, a thermoset resin, and a light hardening resin. Among them, a light hardening resin is preferable in the view point that it is easy and fast to harden, and when it is hardened, the lens forming material and the substrate do not become high temperature.

Such a light hardening resin is made by hardening a resin composition which has: usually at least one or more functional group; and at least monomers and oligomers, and a light polymerization initiator. The monomers and oligomers are subjected to ionic polymerization or radical polymerization by ion or radical generated by irradiating light to a light polymerization initiator, and increased in molecular weight, and a cross-linked structures of the monomers and oligomers are formed, according to requirement. Here, the functional group is an atomic group or a bonding pattern, which causes reaction, such as a vinyl group, a carboxyl group, and a hydroxyl group.

Given as examples of such a monomer or oligomer are an unsaturated polyester type, an enethiol type, an acrylic type. Among them, an acrylic type is preferable in view of hardening speed and wide selectivity of various properties. Examples of such a monomer or oligomer of acrylic type having a monofunctional group include 2-ethylhexylacrylate, 2-ethylhexyl EO adduct acrylate, ethoxydiethylene glycol acrylate, 2-hydroxyethylacrylate, 2-hydroxypropylacrylate, caprolactone adducts of 2-hydroxyethylacrylate, 2-phenoxyethylacrylate, phenoxydiethylene glycol acrylate, nonylphenol EO adduct acrylate, caprolactone addition nonylphenol EO adduct acrylate, 2-hydroxy-3-phenoxypropylacrylate, tetrahydrofurfurylacrylate, caprolactone adduct acrylate of furfuryl alcohol, acryloylmorpholine, dicyclopentenylacrylate, dicyclopentanylacrylate, dicyclopentenyloxyethylacrylate, isobornylacrylate, caprolactone adduct acrylate of 4,4-dimethyl-1,3-dioxolane and caprolactone adduct acrylate of 3-methyl-5,5-dimethyl-1,3-dioxolane.

Examples of such a monomer or oligomer of acrylic type having a polyfunctional group include hexanediol diacrylate, neopentyl glycol diacrylate, polyethylene glycol diacrylate, tripropylene glycol diacrylate, diacrylate of neopentyl glycol hydroxypivalate ester, caprolactone adduct diacrylate of neopentyl glycol hydroxypivalate ester, acrylic acid adduct diglycidyl ether of 1,6-hexanediol, diacrylate of an acetal compound of hydroxypivalaldehyde and trimethylolpropane, 2,2-bis[4-(acryloyloxydiethoxy)phenyl]propane, 2,2-bis[4-(acryloyloxydiethoxy)phenyl]methane, hydrogenated bisphenolethylene oxide adduct diacrylate, tricyclodecanedimethanol diacrylate, trimethylolpropane triacrylate, pentaerythritol triacrylate, trimethylolpropanepropylene oxide adduct triacrylate, glycerol propylene oxide adduct triacrylate, dipentaerythritol hexaacrylate pentaacrylate mixtures, caprolactone adduct acrylate of dipentaerythritol, tris (acryloyloxyethyl) isocyanurate and 2-acryloyloxyethyl phosphate.

In addition, light diffusive particles may be mixed and dispersed in advance in the light transmissive resin above described. Examples of the light diffusive particles include the particles of silica, alumina, titania, calcium carbonate, aluminum hydroxide, acrylate resin, organic silicon resin, polystyrene, urea resin, and formaldehyde condensate. One of these is used, or plural types of these are mixed and used. In order that the light diffusive particles can make full use of light diffusibility, in a case that the diffusive particles are light transmissive, refraction factor of the particles must be sufficiently different from that of the light transmissive resin. Therefore, when the light diffusive particles are light transmissive, they are appropriately selected and used depending on the light transmissive resin to be used so that such requirements are satisfied.

The light diffusive particles are adjusted so as to be in liquid form dischargeable from the liquid droplet discharging head by being dispersed in the light transimissive resin in advance as described above. For such light diffusive particles, it is preferable to enhance dispersibility of the light diffusive particles to the light transmissive resin by carrying out a coating processing to the light diffusive particles surface with surfactants or a processing of covering the surface with melted resin. By such a processing, flowability in which discharging from the liquid droplet discharging head is good can be added to the light transmissive resin in which the light diffusive particles are dispersed. As for the surfactants used for carrying out the coating processing, the surfactants of cation series, anion series, nonion series, zwitterion, silicon series, fluorine resin, and the like are appropriately selected and used depending on types of the light diffusive particles.

It is preferable to use the light diffusive particles having a particle diameter of 5 nm or more and 1000 nm or less. More preferably, the particles having a particle diameter of 200 nm or more and 500 nm or less are used. In such a range, the light diffusibility of the particles is secured favorably in a range of the particle diameter of 200 nm or more, and the particles can be discharged favorably from the liquid droplet discharging head in a range of the particle diameter of 500 nm or less.

The elliptical shaped microlens 30 made from the light transmissive resin in which the light diffusive particles are mixed and dispersed is complicated by the light diffusive particles. Therefore, the microlens is imparted with higher diffusive performance and suppressed in thermoplasticity, and so can have excellent heat resistance.

Further, resins containing an inorganic component can be employed from the view that heat resistance and excellent light transmissivity can be obtained. Specifically, can be cited silicon, germanium, titanium, and the like. A resin containing silicon is preferable in view of easiness in procurement.

Examples of such a polymer include polysiloxane, polysilane, and polysilazane. These compounds contain silicon in polymer main chain skeleton, and constitute silicon oxide similar to a glass by chemical reaction by heat, light, a catalyst, and the like. The silicon oxide thus constituted has excellent heat resistance and light transmissivity in compared with the resin consisting of the organic material, and therefore is preferable as microlens material.

Specifically, a polysiloxane solution having an alkoxy group is, after discharged together with a catalyst, dried and heated to condense the alkoxy group, and thereby the silicon oxide can be obtained. Further, a polysilane solution is discharged and then irradiated with ultraviolet light to photooxidize the polysilane, and thereby the silicon oxide can be obtained. A polysilazane solution is discharged and then the polysilazane is hydrolyzed by ultraviolet light, acid, alkali and the like and oxidized, and thereby the silicon oxide can be obtained.

Ink of the microlens material may be added with a surface tension adjusting agent of fluorine series, silicon series, nonion series and others in minute amounts in such a range that the intended function is not lost, according to requirement. These surface tension adjusting agents can control wettability of an object to be applied with the ink, improve levelring of an applied film, and help suppressing generation of bumps, irregularity, and the like.

A density of the droplet of the microlens material adjusted as described above is preferably from 1 to 50 mPa.s. When the solution is applied by use of a liquid droplet discharging apparatus, in a case that the density is less than 1 mPa·s, the periphery of the nozzle is likely to be contaminated by the droplet flowing out, and in a case that the density is more than 50 mPa·s, the clogging of the nozzle hole more frequently occurs and the droplet is difficult to smoothly discharge. More preferably, it is from 5 to 20 mPa.s.

Furthermore, a surface tension of the droplet of the microlens material adjusted as described above is preferably from 1 to 50 mPa.s. The surface tension in this case is desirably in a range from 0.02 to 0.07 N/m. When the solution is applied by use of a liquid droplet discharging apparatus, in a case that the surface tension is less than 0.02 N/m, the wettability of the droplet with respect to the nozzle surface is increased and a curved flight is likely to occur, and in a case that the surface tension exceeds 0.07 N/m, since a meniscus shape is not stable at the tip of the nozzle, the amount and timing of discharge are difficult to control.

Hardening process method of the bank material and microlens material

Examples of the hardening process of bank material and microlens material include a heat processing and/or a processing by light, which is normally performed in the ambient atmosphere. However, according to requirements, it can be performed in an inactive gas atmosphere, such as nitrogen, argon, and helium. The processing conditions for this heat processing and/or processing by light are set suitably, in consideration of the boiling point (the vapor pressure) of the solvent, the type and pressure of the gas atmosphere, the reaction temperature or reaction light exposure amount of the polymerization initiator, the reaction temperature or reaction light exposure amount of the cross-linking reaction, the glass transition temperature of the oligomer and monomer, the heat resistant temperature of the substrate, the thermal behavior of the minute particles such as their dispersibility and oxidizability and so on.

In the processing by light, the microlens material can be hardened and formed by use of ultraviolet light, far-ultraviolet light, electron ray, X-ray and the like, which are each preferably 1 $J/cm^2$ or less, and more preferably 0.2 $J/cm^2$ or less for improvement of productivity. The heat processing can be carried out by using a hot plate, an electric furnace, and in addition, a lamp annealing. The processing temperature is desirably 200 degrees C. or less so long as it is not more than the glass transition temperature of the material to be hardened. When the micolens material is heated up at a higher temperature than the glass transition temperature, there is a fear of deforming the material into a shape having lower curvature due to heat problem.

The forming method of the elliptical shaped microlens 30 is explained briefly. The forming methods 1 to 4 are described in the following.

Forming Method 1

FIGS. 5A to 5D are views showing a method of forming an elliptical shaped microlens 30. With reference to the FIGS. 5A to 5D, the method of forming the elliptical shaped microlens 30 formed by the liquid droplet discharging method. The forming method 1 includes a step of disposing a droplet composed of the lens material on a substrate; a step of forming a droplet of elliptical shape, in which before the disposed droplet is hardened, a droplet is disposed at a displaced position from the disposed droplet so as to overlap a part of the disposed droplet; and a step of hardening the elliptical shaped droplet.

In order to perform a liquid repellent process favorably, it is preferable to wash the substrate P as a pretreatment of the liquid repellent process. As the washing method of the substrate P, can be employed ultraviolet washing, ultraviolet/ozone washing, plasma cleaning, acid/alkali washing and the like, for example.

Next, the surface of the substrate P is subjected to the surface treatment. In the surface treatment of the substrate P, for the purpose of reducing an impact diameter of the lens material, which is to be a lens diameter, liquid repellency is imparted to the surface of the substrate P so that a required contact angle can be obtained. As a method of imparting the liquid repellency to the surface of the substrate P, can be employed a method of forming an organic thin film on the surface of the substrate P, a plasma processing and the like. Here, the method of forming an organic thin film is employed. Therefore, the surface of the substrate P is given the liquid repellency.

Figure 5A:
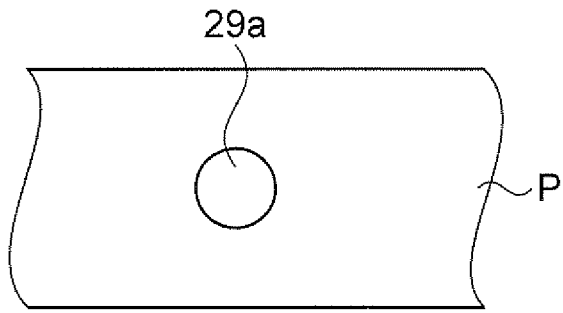
FIGS. 5A to 5D are views showing a method of forming an elliptical shaped microlens.

Next, in the step of disposing a droplet composed of the lens material, the microlens material is discharged from a liquid droplet discharge head 1 on the substrate P given the liquid repellency, and a droplet 29a is disposed (see, FIG. 5A). As the conditions under which the droplets are discharged, for example, it is possible to employ a weight of the droplet of about 4 ng/dot, and a droplet speed (discharging speed) of 5 to 7 m/sec. Furthermore, it is preferable to set the ambient atmosphere under which the droplets are discharged to be at a temperature of less than or equal to 60 degrees C. and a humidity of less than or equal to 80%. By doing this, it is possible for the discharge nozzle of the liquid droplet discharging head 1 to discharge of the droplets in a stable manner without any clogging taking place. As the microlens material, a thermoset resin solution as well as a light hardening resin solution is selected. A mode of resin may be either a polymer or a monomer. When a monomer is in a liquid, the monomer itself may be used in stead of a solution thereof. In addition, a polymer solution not functional to heat or light may be used. Since the liquid repellency is imparted to the surface of the substrate P, the droplet 29a is likely to be repelled and likely to have a semispheric shape.

Figure 5B:
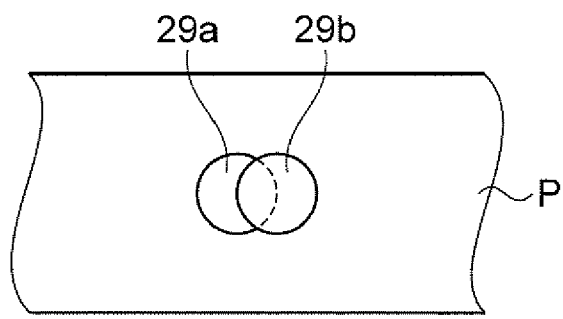
Figure 5C:
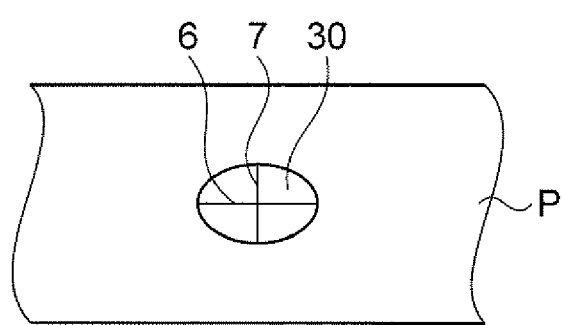
Figure 5D:
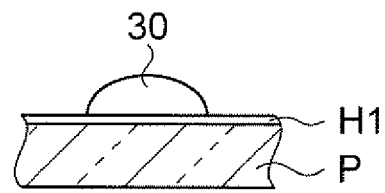

Next, in the step of forming a droplet of elliptical shape, in the vicinity of the droplet 29a disposed on the substrate P, before the droplet 29a is hardened, a droplet 29b is further disposed by discharging the microlens material from the liquid droplet discharge head 1 (see, FIG. 5B). The droplet 29b is disposed such that a disposing position of the droplet 29b is displaced slightly from the disposing position of the droplet 29a so as to overlap a part of the droplet 29a. Therefore, the droplet 29a and the droplet 29b are brought into contact with each other. At this time, since the disposing positions of the droplet 29a and the droplet 29b are displaced from each other, the whole shape of them is likely to have an elliptical shape.

Lastly, in the step of hardening the elliptical shaped droplet, a hardening process is performed in order to hold the shape of the microlens disposed on the substrate P. Then, a microlens 30 of elliptical shape is formed (see, FIGS. 5C and 5D). On the substrate P, a liquid repellent layer H1 is formed which is given the liquid repellency. Furthermore, a plurality of microlenses 30 are formed, and a microlens array 35 is formed in which the long axis directions of the first microlens 30a and the second microlens 30b are perpendicular to each other (see, FIG. 2).

Forming Method 2

FIGS. 6A to 6G are views showing a method of forming an elliptical shaped microlens 30. With reference to the FIGS. 6A to 6G, the method of forming an elliptical shaped microlens 30. Since the microlens material, the surface treatment process, the disposing method, the hardening process method and the like are similar to those described above, the explanation is omitted. The forming method 2 includes a step of disposing a first droplet composed of the lens material on the substrate, a step of hardening the first droplet to form a lens, a step of disposing a second droplet less in an amount than the first droplet so as to overlap a part of the lens, a step of hardening the second droplet to form an elliptical shaped lens, a step of disposing a third droplet further at a disposing position opposed to the second droplet so as to overlap a part of the elliptical shaped lens, and a step of hardening the third droplet.

In the forming method 2, the substrate P is washed and liquid repellency is imparted to the surface of the substrate P in a manner similar to the forming method 1.

Figure 6A:
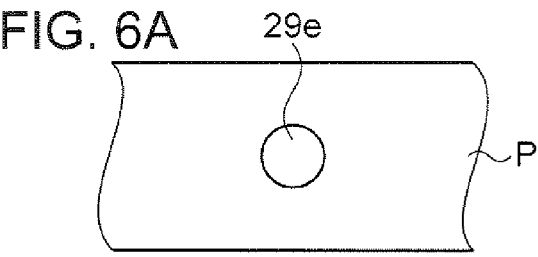
FIGS. 6A to 6G are views showing a method of forming an elliptical shaped microlens.

Next, in the step of disposing the first droplet composed of the lens material, a droplet 29e is disposed on the substrate P given the liquid repellency by discharging the microlens material from the liquid droplet discharging head 1 (see, FIG. 6A).

Figure 6B:
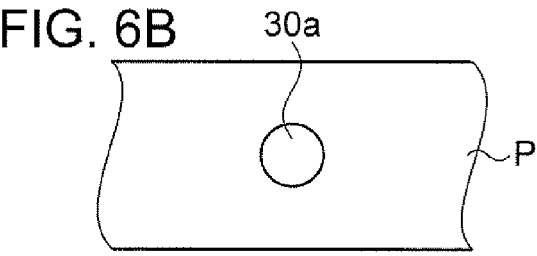
Figure 6C:
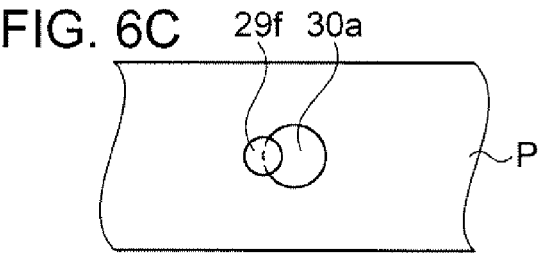

Next, in the step of hardening the first droplet to form a lens, the droplet 29e is hardened to form a lens 30a (FIG. 6B).

Next, in the step of disposing the second droplet so as to overlap a part of the lens, the droplet 29f is disposed so as to overlap a part of the lens 30a (see, FIG. C). Since an amount of the droplet 29f is less than that of the droplet 29e, a size of the droplet 29f is smaller than that of the droplet 29e. When the droplet 29*f* is disposed, detailed illustrations thereof being omitted, the droplet 29*f* spreads to be approximately an elliptical shape.

Figure 6D:
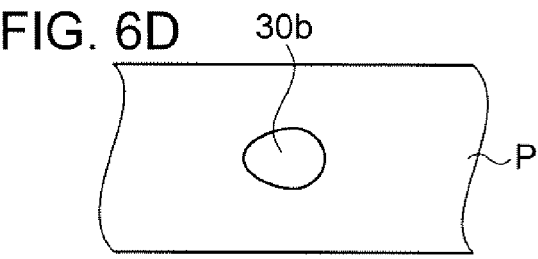

Next, in the step of hardening the second droplet to form an elliptical shaped lens, the droplet 29*f* is hardened to form a lens 30*b* of approximately elliptical shape (see, FIG. 6D).

Figure 6E:
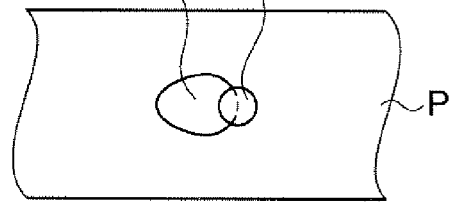

Next, in the step of disposing the third droplet further, a droplet 29*g* is disposed so as to overlap the lens 30*b* (see, FIG. 6E). Since an amount of the droplet 29*g* is less than that of the droplet 29*e*, a size of the droplet 29*g* is smaller than that of the droplet 29*e*. When the droplet 29*g* is disposed, detailed illustrations thereof being omitted, the droplet 29*g* spreads to be approximately an elliptical shape.

Figure 6F:
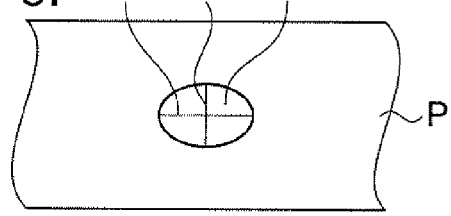
Figure 6G:
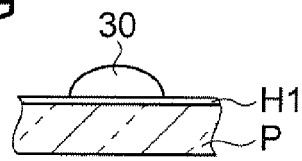

Lastly, in the step of hardening the third droplet, when the third droplet is hardened, a microlens 30 of elliptical shape is formed (see, FIGS. 6F and 6G). On the substrate P, a liquid repellent layer H1 is formed which is given the liquid repellency. Furthermore, a plurality of microlenses 30 are formed, and a microlens array 35 is formed in which the long axis directions of the first microlens 30*a* and the second microlens 30*b* are perpendicular to each other (see, FIG. 2).

Forming Method 3

FIGS. 7A to 7F are views showing a method of forming an elliptical shaped microlens 30. With reference to the FIGS. 7A to 7F, the method of forming an elliptical shaped microlens 30. The forming method 3 includes a step of disposing a first droplet composed of the bank material on the substrate, step of forming a base of elliptical shape by hardening the first droplet disposed on the substrate, a step of disposing a second droplet composed of the lens material on the elliptical shaped base, and a step of hardening the second droplet.

In the forming method 3, the substrate P is washed and liquid repellency is imparted to the surface of the substrate P in a manner similar to the forming method 1.

Figure 7A:
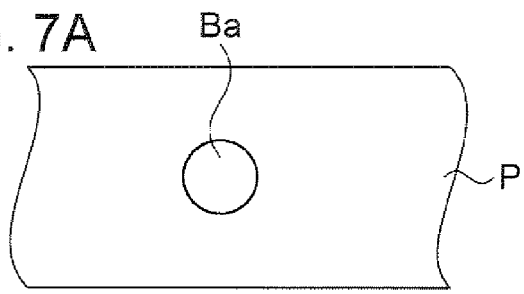
FIGS. 7A to 7F are views showing a method of forming an elliptical shaped microlens.

In the step of disposing the first droplet composed of the bank material, a droplet Ba is disposed on the substrate P given the liquid repellency by discharging the bank material from the liquid droplet discharging head 1 (see, FIG. 7A). As the conditions under which the droplets are discharged, for example, it is possible to employ a weight of the droplet of about 4 ng/dot, and a droplet speed (discharging speed) of 5 to 7 m/sec. Furthermore, it is preferable to set the ambient atmosphere under which the droplets are discharged to be at a temperature of less than or equal to 60 degrees C. and a humidity of less than or equal to 80%. By doing this, it is possible for the discharge nozzle of the liquid droplet discharging head 1 to discharge of the droplets in a stable manner without any clogging taking place.

Figure 7B:
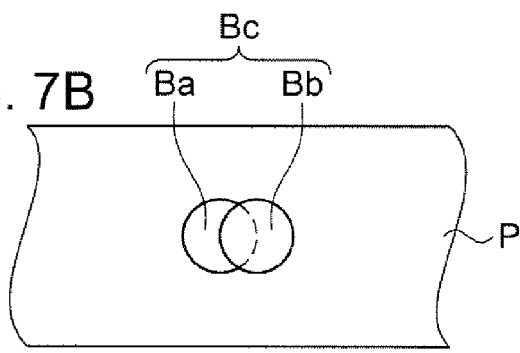
Figure 7C:
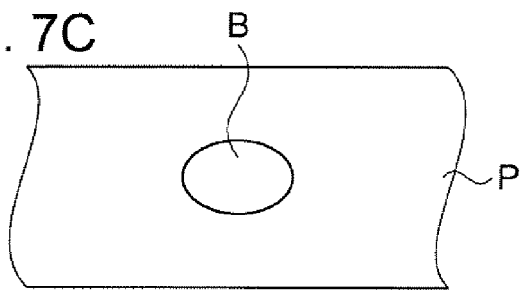

Next, in the vicinity of the droplet Ba disposed on the substrate P, before the droplet Ba is hardened, a droplet Bb is further disposed by discharging the bank material from the liquid droplet discharge head 1 (see, FIG. 7B). The droplet Ba is disposed such that a disposing position of the droplet Ba is displaced slightly from the disposing position of the droplet Ba so as to overlap a part of the droplet Ba. Therefore, the droplet Ba and the droplet Bb are brought into contact with each other. At this time, since the disposing positions of the droplet Ba and the droplet Bb are displaced from each other, a droplet Bc is likely to have an elliptical shape.

Next, in the step of forming the base of elliptical shape, a solvent for the droplet Bc disposed on the substrate P is vaporized (evaporated) and dried, and then hardened. Therefore, a bank B of elliptical shape is formed (see, FIG. 7C). The bank B may be subjected to the liquid repellent process. If the liquid repellency is imparted to the surface of the bank B, such a phenomenon can be prevented from occurring that the microlens material disposed on the bank B overflows from the surface of the bank B.

Figure 7D:
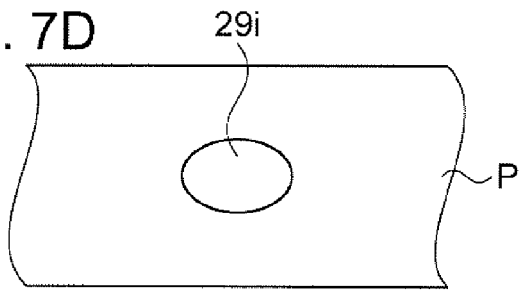

Next, in the step of disposing the second droplet composed of the lens material on the elliptical shaped base, a droplet 29*i* is disposed on the elliptical shaped bank B formed on the substrate P by discharging the microlens material from the liquid droplet discharging head 1 (see, FIG. 7D). The droplet 29*i* made from the microlens material has an elliptical shape.

Figure 7E:
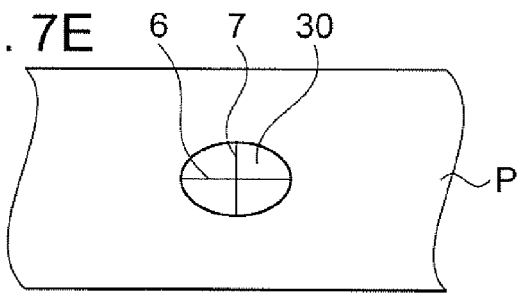
Figure 7F:
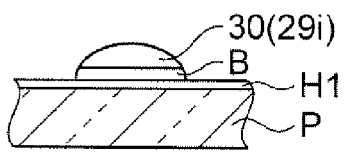

Lastly, in the step of hardening the second droplet, when the droplet 29*i* is hardened, a microlens 30 of elliptical shape is formed (see, FIGS. 7E and 7F). On the substrate P, a liquid repellent layer H1 is formed which is given the liquid repellency. Furthermore, a plurality of microlenses 30 are formed, and a microlens array 35 is formed in which the long axis directions of the first microlens 30*a* and the second microlens 30*b* are perpendicular to each other (see, FIG. 2).

Forming Method 4

FIGS. 8A to 8E are views showing a method of forming an elliptical shaped microlens 30. With reference to the FIGS. 8A to 8E, the method of forming an elliptical shaped microlens 30. The forming method 4 includes a step of disposing a plurality of droplets composed of the lens material on the substrate such that the droplets are spaced from one another, a step of hardening the plurality of droplets to form a plurality of lenses, a step of further disposing droplets between the plurality of lenses formed, and a step of hardening the droplets.

In the forming method 4, the substrate P is washed and liquid repellency is imparted to the surface of the substrate P in a manner similar to the forming method 1.

Figure 8A:
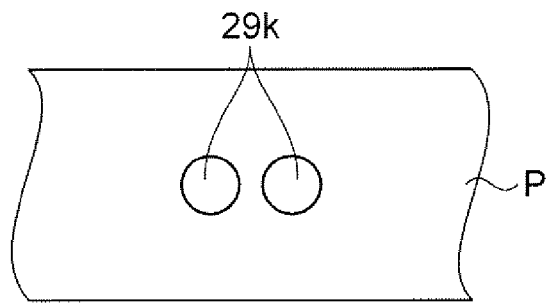
FIGS. 8A to 8E are views showing a method of forming an elliptical shaped microlens.

Next, in the step of disposing a plurality of droplets composed of the lens material such that the droplets are spaced from one another, a plurality of droplets 29*k* (two, in this example) are disposed on the substrate P given the liquid repellency by discharging the microlens material from the liquid droplet discharging head 1 (see, FIG. 8A).

Figure 8B:
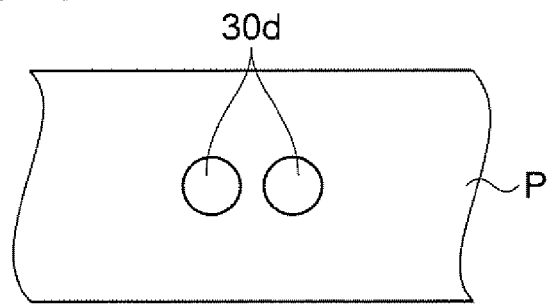

Next, in the step of hardening the droplets to form a plurality of lenses, the plurality of droplets 29*k* are hardened to form lenses 30*d* (see, FIG. 8B).

Figure 8C:
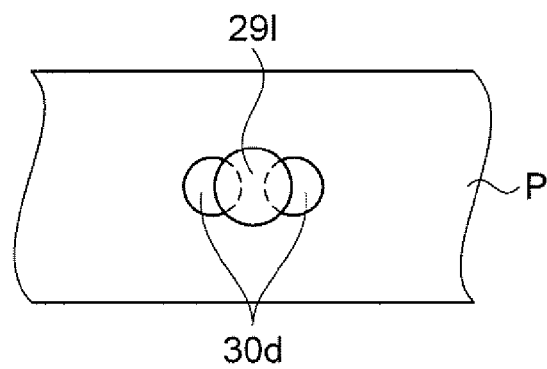

Next, in the step of disposing droplets, a droplet 29*l* is disposed so as to bridge a gap between the lenses 30*d* (see, FIG. 8C). When the droplet 29*l* is disposed, the droplet 29*l* spreads to be approximately an elliptical shape. Further, it is preferable that an amount of the droplet 29*l* is more than that of the droplet 29*k*, thereby the elliptical shape thereof tends to be formed with more accuracy.

Figure 8D:
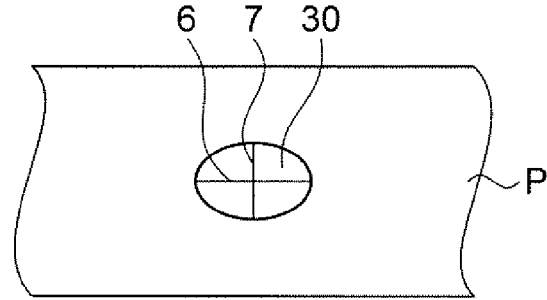
Figure 8E:
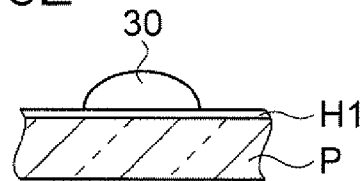

Lastly, in the step of hardening the droplets, when the droplet 29*l* is hardened, a microlens 30 of elliptical shape is formed (see, FIGS. 8D and 8E). On the substrate P, a liquid repellent layer H1 is formed which is given the liquid repellency. Furthermore, a plurality of microlenses 30 are formed, and a microlens array 35 is formed in which the long axis directions of the first microlens 30*a* and the second microlens 30*b* are perpendicular to each other (see, FIG. 2).

The microlenses 30 formed by the forming methods 1 to 4 are formed by the liquid droplet discharging method. Therefore, the microlens 30 formed on the substrate P has an ellipsoid form in a convex manner (see, FIGS. 1 and 3).

In this embodiment, the following effects can be obtained.

1. In the construction where the first microlens 30*a* and the second microlens 30*b* are disposed in such a direction that they are perpendicular to each other, and the long axis directions of the first microlens 30*a* and the liner-shaped lamp 41 are arranged approximately parallel to each other, the long axis 6 of the first microlens 30a is arranged approximately parallel to the long axis of the liner-shaped lamp 41. Therefore, light is likely to diffuse with resulting lowering the brightness ununiformity at the long axis 6 having smaller curvature than the short axis 7. On the other hand, since the short axis 7 of the second microlens 30b is arranged approximately perpendicular to the long axis direction of the liner-shaped lamp 41. Therefore, light is likely not to diffuse with resulting the higher lightness at the short axis 7 having larger curvature than the long axis 6. That is, by disposing the elliptical shaped microlenses 30 as described above, such a diffusing plate 43 can be formed that has the lower brightness ununiformity and the higher lightness. Since the backlight unit 40 has the diffusing plate 43 provided with the lowered brightness ununiformity and the higher lightness, the number of the liner-shaped lamps 41 as a light source need not be increased, and thereby the problems such as the heat generation, cost, and mass of the liner-shaped lamp 41 can be suppressed. Moreover, the backlight unit 40 more reduced in weight can be formed. In addition, since a distance between the liner-shaped lamp 41 and a display screen surface can be decreased, the thickness of the backlight unit 40 can be reduced.

2. The elliptical shaped microlenses 30, being disposed in a zigzag fashion on the substrate P, are disposed on the substrate P with a high density. Therefore, the light-diffusing property and light-collecting property tend to be more enhanced, and there can be provided the backlight unit 40 having less brightness ununiformity and higher lightness.

3. The elliptical shaped microlens 30 is formed on the substrate P by a liquid droplet discharging method. Therefore, if the shape (size) or position of the microlens is changed, it is easily done by only varying the condition of the liquid droplet discharging method. In addition, since it is not necessary to prepare molds every time of changing the shape (size) or position of the microlens unlike the related art, a cost of making molds dose not occur, and it is economical.

Next, there is explained a liquid crystal display device 100 as an electro-optic device of the embodiment of the invention using the backlight unit 40 having the diffusing plate 43.

Figure 9:
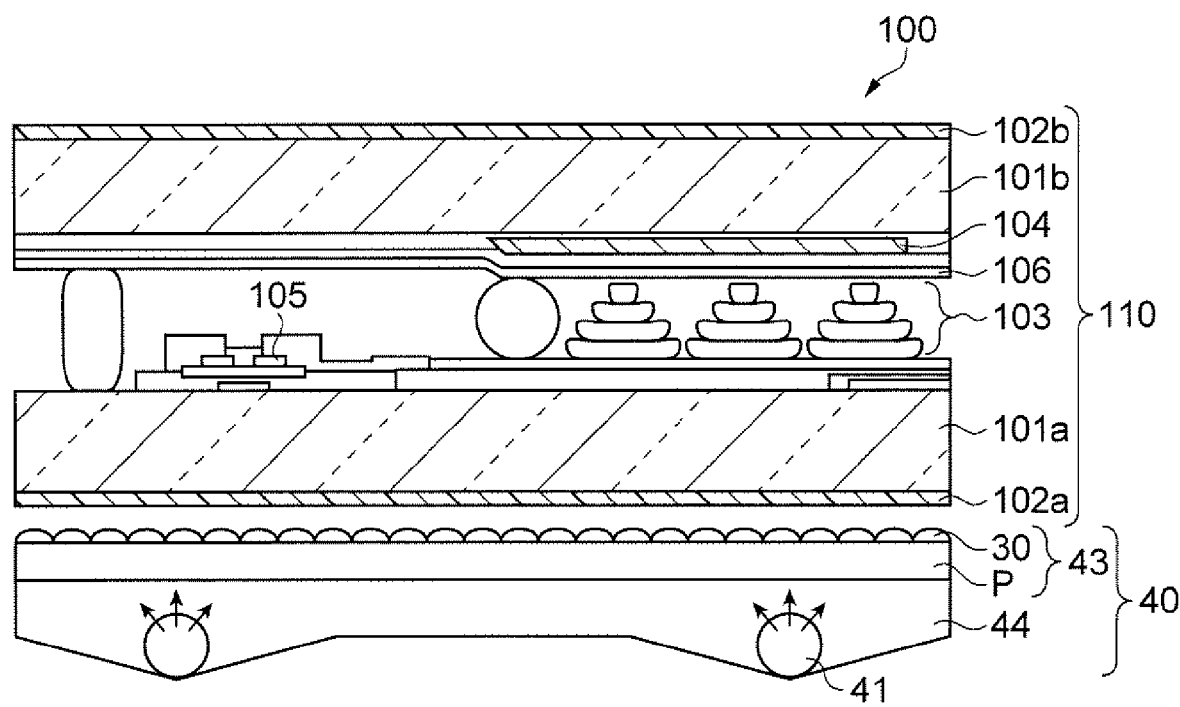
FIG. 9 is a view showing a specific example of a liquid crystal display device.

FIG. 9 is a view showing the liquid crystal display device 100. It should be understood that the scale of a liquid crystal panel 110 is different from the scale of the backlight unit 40 in the FIG. 9. The liquid crystal display device 100 is constructed with the backlight unit 40, the liquid crystal panel 110, a driver LSI (illustrating is omitted), and the like. The liquid crystal panel 110 is constructed with two glass substrates 101a and 101b, two polarizing plates 102a and 102b, a color filter 104 and the like. The polarizing plates 102a and 102b are attached to the outer surfaces of the glass substrates 101a and 101b, respectively. The glass substrate 101a is formed with a TFT 105, and the like on the inner surface thereof. The glass substrate 101b is formed with the color filter 104, an orientation film 106, and the like on the inner surface thereof. A liquid crystal 103 is disposed between the glass substrates 101a and 101b.

The glass substrates 101a and 101b are transparent substrate constituting the liquid crystal panel 110. The polarizing plates 102a and 102b can allow a specific polarization component to pass through or can absorb the component. The property of the liquid crystal 103 can be adjusted by mixing plural types of nematic liquid crystals. The color filter 104 is a resin film containing a dye or a pigment which has three primary colors RGB. The TFT 105 is a driving switching element for driving the liquid crystal 103. The orientation film 106 is an organic thin film for orienting the liquid crystal 103, and is mainly a polyimide thin film.

Light emitted from the backlight unit 40 passes through the polarizing plate 102a and the glass substrate 101a, and further passes through the liquid crystal 103, the orientation film 106, and the color filter 104 in this order, and a predetermined image and video can be displayed on the liquid crystal panel 110. The liquid crystal display device 100 is provided with the backlight unit 40 which is good in optical characteristics and can be reduced in weight and thickness. Therefore, there can be provided the liquid crystal display device 100 which is good in optical characteristics and can be reduced in weight and thickness. Moreover, the productivity of the backlight unit 40 and the liquid crystal display device 100 can be improved because they are manufactured by the method in which the diffusing plate 43 provided with the elliptical shaped microlenses 30 is easily formed by the liquid droplet discharging method.

Figure 10:
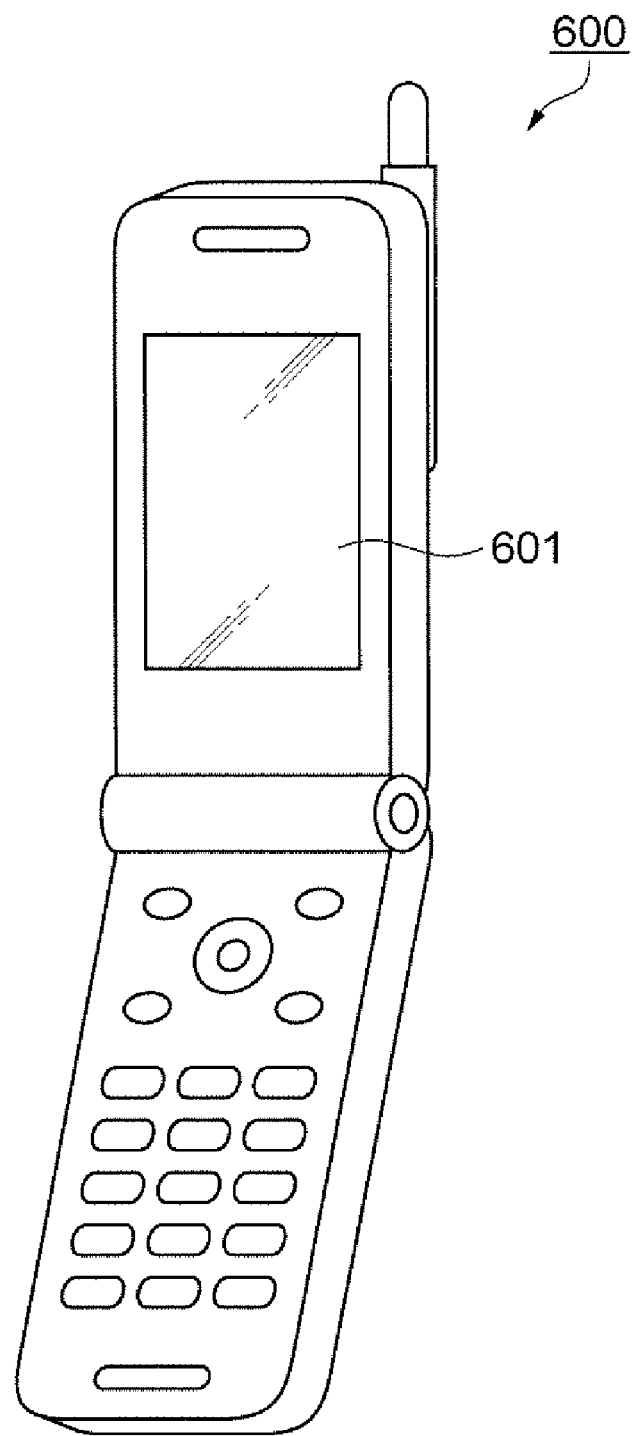
FIG. 10 is a view showing a portable telephone as an electronic apparatus.

FIG. 10 is a view showing an example of a portable telephone 600 as an electronic apparatus provided with the liquid crystal display device 100 as an electro-optic device shown in FIG. 9. FIG. 10 shows the portable telephone 600 and a liquid crystal display part 601 provided with the liquid crystal display device 100. The portable telephone 600 is provided with the liquid crystal display device 100 which is low in brightness ununiformity and high in lightness, and can be reduced in weight and thickness. Therefore, there can be provided, for example, the portable telephone 600 as an electronic apparatus which is improved in display performance and can be reduced in weight and thickness. Moreover, the productivity of portable telephone 600 can be improved because it has the liquid crystal display device 100 improved in productivity.

Hereinbefore, the invention is described with the preferred embodiments. However, the invention is not limited to the above-mentioned example, but can also include modifications described below, and can be applied to any other specific constructions and configurations within the scope that advantage of the aspects of the invention is achieved.

Modified Example 1

In the above-mentioned embodiment, the direct-lighting type construction is employed in which the backlight unit 40 is constructed such that liner-shaped lamp 41 is arranged directly under the diffusing plate 43, but not limited to this manner. For example, the side-light type construction may be employed in which the liner-shaped lamp 41 is arranged on the side face of the light-guiding plate. In this manner, also can be obtained the same effect as the above-mentioned embodiment, and there can be provided the backlight unit 40 in which the brightness ununiformity can be lowered and the lightness is high.

Modified Example 2

In the backlight unit 40 of the above-mentioned embodiment, the elliptical shaped microlens 30 is a convex shape, but not limited to this. For example, the elliptical shaped microlens 30 may be made in a concave shape by the pinning effect due to the coffee-stain phenomenon and the like. In this manner, also can be obtained the same effect as the above-mentioned embodiment, and there can be provided the back-light unit 40 in which the brightness ununiformity can be lowered and the lightness is high.

Modified Example 3

In the above-mentioned embodiment, the elliptical shaped microlens 30 is formed by the liquid droplet discharging method, but not limited to this. For example, the elliptical shaped microlens 30 may be made by use of molds and the like. In this manner, also can be obtained the same effect as the above-mentioned embodiment, and there can be provided the backlight unit 40 in which the brightness ununiformity can be lowered and the lightness is high.

What is claimed is:

1. A backlight unit comprising:
    a light source that irradiates light; and
    a diffusing plate that diffuses light irradiated from the light source, wherein the diffusing plate is provided with a plurality of microlenses, wherein all of the plurality of microlenses of the diffusing plate have an ellipsoid form, wherein the plurality of microlenses includes a plurality of first microlenses and a plurality of second microlenses, wherein the plurality of first and second microlenses are disposed so that long axes of the plurality of first microlenses and long axes of the plurality of second microlenses are approximately perpendicular to each other and such that the plurality of first and second microlenses are arranged in a plurality of substantially aligned rows and a plurality of substantially aligned columns, and wherein the plurality of first and second microlenses are alternatingly arranged within each row and column, and
    a long axis direction of the plurality of first microlenses and a long axis direction of the light source are arranged approximately parallel to each other, and a long axis direction of the plurality of second microlenses and the long axis direction of the light source are arranged approximately perpendicular to each other.

2. The backlight unit according to claim 1, wherein the backlight unit is a direct-lighting type.

3. The backlight unit according to claim 1, wherein each of the plurality of substantially aligned rows defines a first longitudinal direction and each of the plurality of substantially aligned columns defines a second longitudinal direction, and wherein each of the plurality of substantially aligned rows is offset in the first longitudinal direction with respect to an adjacent one of the plurality of substantially aligned rows and each of the plurality of substantially aligned columns is offset in the second longitudinal direction with respect to an adjacent one of the plurality of substantially aligned columns such that each of the plurality of first microlenses is immediately adjacent corresponding ones of the plurality of second microlenses in both the first and second longitudinal directions.

4. The backlight unit according to claim 1, wherein the plurality of first and second microlenses are formed by a liquid droplet discharging method.

5. A method of manufacturing a backlight unit, which is provided with a light source that irradiates light, and a diffusing plate that diffuses the light irradiated from the light source, comprising:
    forming the diffusing plate having a plurality of microlenses such that all of the plurality of microlenses of the diffusing plate have an ellipsoid form and such that the plurality of microlenses include a plurality of first microlenses and a plurality of second microlenses, wherein the plurality of first and second microlenses are disposed so that long axes of the plurality of first microlenses and long axes of the plurality of second microlenses are approximately perpendicular to each other and such that the plurality of first and second microlenses are arranged in a plurality of substantially aligned rows and a plurality of substantially aligned columns, and wherein the plurality of first and second microlenses are alternatingly arranged within each row and column; and
    assembling the backlight unit so that a long axis direction of the plurality of first microlenses and a long axis direction of the light source are arranged approximately parallel to each other, and a long axis direction of the plurality of second microlenses and the long axis direction of the light source are arranged approximately perpendicular to each other.

6. The method of manufacturing a backlight unit according to claim 5, wherein in assembling the backlight unit, the backlight unit is assembled underneath the diffusing plate.

7. The method of manufacturing a backlight unit according to claim 5, wherein in forming the diffusing plate, each of the plurality of substantially aligned rows defines a first longitudinal direction and each of the plurality of substantially aligned columns defines a second longitudinal direction, and wherein each of the plurality of substantially aligned rows is offset in the first longitudinal direction with respect to an adjacent one of the plurality of substantially aligned rows and each of the plurality of substantially aligned columns is offset in the second longitudinal direction with respect to an adjacent one of the plurality of substantially aligned columns such that each of the plurality of first microlenses is immediately adjacent corresponding ones of the plurality of second microlenses in both the first and second longitudinal directions.

8. The method of manufacturing a backlight unit according to claim 5, wherein in forming the diffusing plate, the first and second microlenses are formed by a liquid droplet discharging method.

* * * * *